J. F. BEGOLE.
ELECTRICAL MEASURING INSTRUMENT.
APPLICATION FILED FEB. 10, 1908.

913,939.

Patented Mar. 2, 1909.
3 SHEETS—SHEET 1.

WITNESSES:
L. L. Mead.
W. F. Alexander.

INVENTOR
J. F. Begole
BY
ATTORNEYS

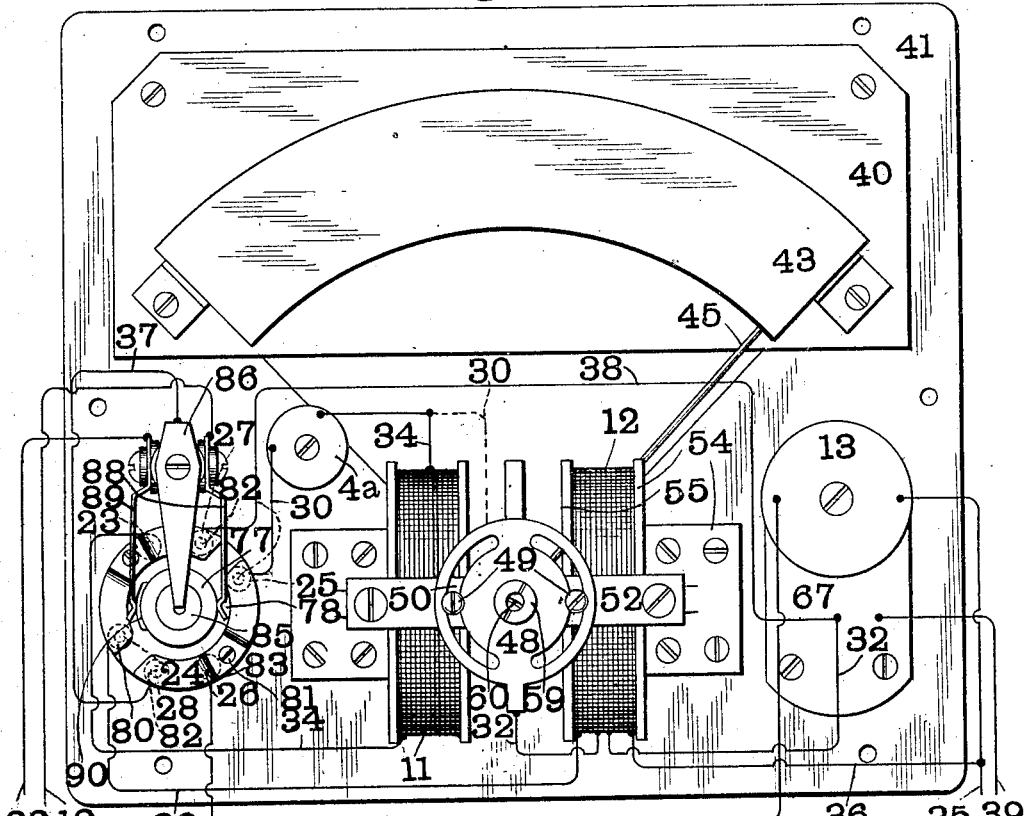

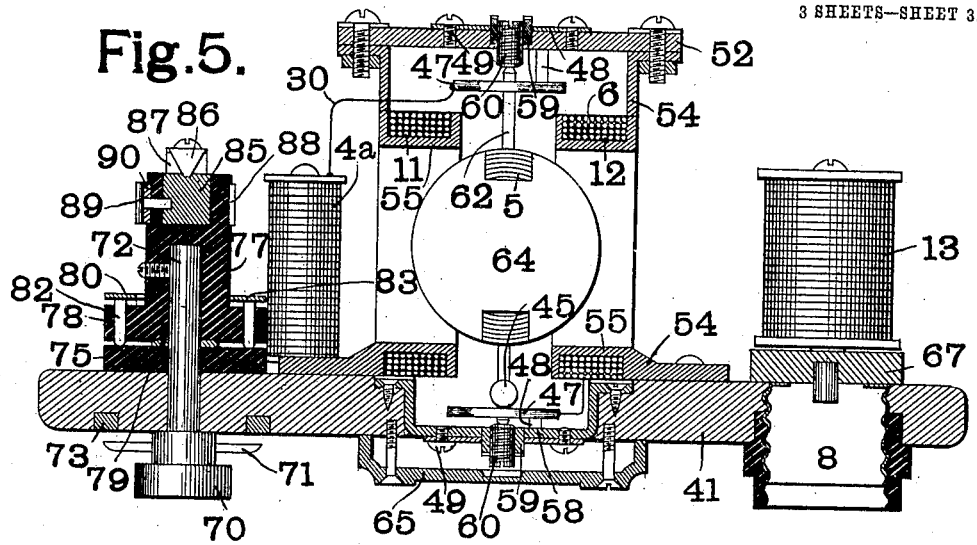

UNITED STATES PATENT OFFICE.

JOSHUA F. BEGOLE, OF ST. LOUIS, MISSOURI, ASSIGNOR TO WAGNER ELECTRIC MANUFACTURING COMPANY, OF ST. LOUIS, MISSOURI, A CORPORATION OF MISSOURI.

ELECTRICAL MEASURING INSTRUMENT.

No. 913,939.  Specification of Letters Patent.  Patented March 2, 1909.

Application filed February 10, 1908. Serial No. 415,118.

*To all whom it may concern:*

Be it known that I, JOSHUA F. BEGOLE, a citizen of the United States, residing at St. Louis, in the State of Missouri, have invented a certain new and useful Electrical Measuring Instrument, of which the following is such a full, clear, and exact description as will enable any one skilled in the art to which it appertains to make and use the same, reference being had to the accompanying drawings, forming part of this specification.

My invention relates to a portable instrument for measuring the voltage drop and watts consumed by any translating device such as a lamp.

In my device, the voltmeter and wattmeter are combined in a single instrument and simple means are provided for changing over from voltmeter to wattmeter, or vice versa, varying the voltage to which the instrument is adapted and compensating for the energy used by the instrument itself when connected to the circuit for measurement.

Figure 1:
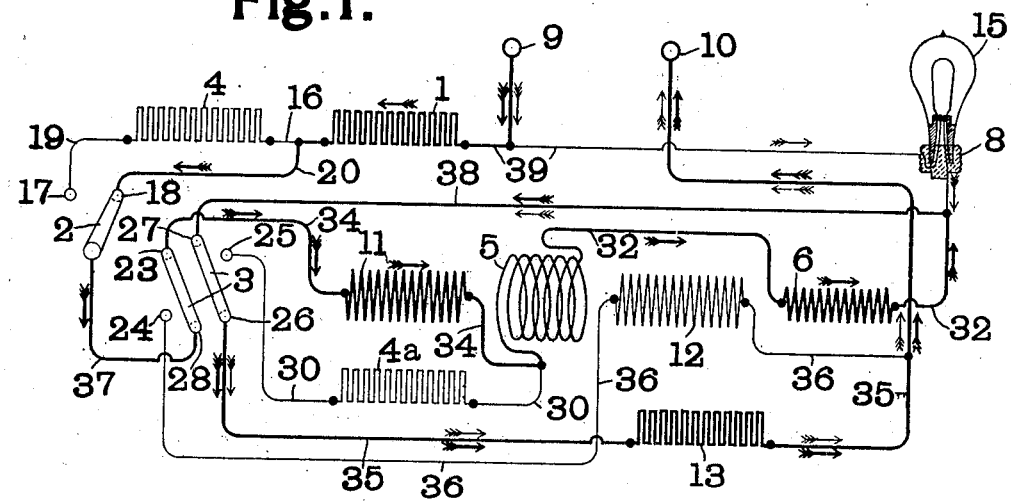
Figure 2:
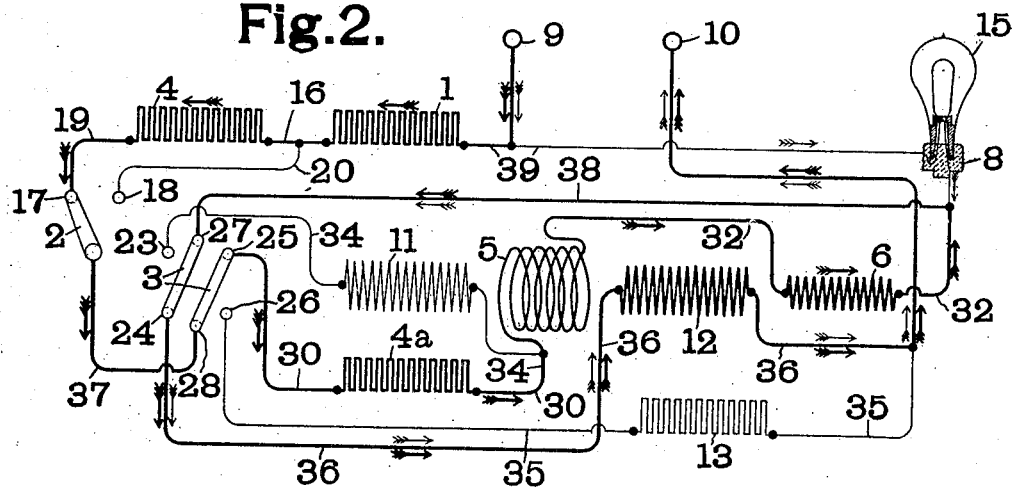

In the drawings, Figures 1 and 2 are diagrams of the circuits for one form in which my invention may be embodied. Fig. 3 is a rear view of the casing cover. Fig. 4 is a view of the resistances. Fig. 5 is a vertical longitudinal section through the casing cover and the parts carried by it and Figs. 6, 7 and 8 are detail views of the switch shown in Figs. 3 and 5.

Like characters of reference refer to similar parts in the different views.

Referring first to Figs. 1 and 2, the two line terminals are indicated at 9 and 10. 8 is the socket or receptacle for the lamp 15 to be measured. 1 and 4 are resistances, connected in series by wire 16. 2 is a switch adapted to vary the amount of the resistances 1 and 4 in circuit by being thrown between contacts 17 and 18, the former connected with said resistance, as shown, by wire 19 and the latter with wire 16 through wire 20. 3 is a double pole switch, the arms of which are adapted to engage the contacts 23, 24, 25, 26, 27 and 28. 4ª is an ohmic resistance connected by a wire 30 with a movable coil 5. The other end of said coil 5 is connected by wire 32 through a compensating coil 6 to the socket or receptacle 8. 11 is a stationary field coil connected between contact 23 and one end of the movable coil 5 by wire 34 and 12 is a second stationary field coil connected between the contact 24 and the wire 35 by a wire 36, the said wire 35 connecting contact 26 to terminal 10 through a resistance 13. Wire 37 connects the switch 2 to contact 28 and wire 38 connects contact 27 with wire 32. 39 is a wire leading from terminal 9 to the resistance 1 and to the other side of the lamp receptacle 8.

Referring now to Figs. 3 and 4, 40 indicates a plate screwed to the lower face of the cover 41. The body of the casing is indicated by 42. Attached to the under side of the plate 40 is the customary dash pot and scale casing 43, into which the outer end of the pointer 45 penetrates and in which it is moved back and forth by the movement of the movable coil 5, by which it is carried at its inner end. Coiled springs 47 are fastened at their outer ends to abutments 48, which are adjustable by means of set screws 49 in slots 50 in the abutments. One of these abutments 48 is carried on a bar 52 mounted on the ends of the coil frames 54 which are also screwed to the cover 41, and upon which the field coils 11 and 12 and the compensating fine copper wire coil 6 are wound in annular slots in bosses 55 made integral with said frames 54. The other of these abutments 48 is carried on an annular member 58 set in a corresponding opening in the cover 41 and fastened thereto by screws as shown. Each of these parts 52 and 58 is provided with a screw threaded bushing 59 in which a set screw 60 may be rotated and form adjustable bearings for the ends of the spindle 62 to which at its opposite ends the inner ends of the springs 48 are fastened in the usual way to oppose their force to the tendency of the coil 5 to rotate in the magnetic field of the coils 11 and 12. The wires 30 and 32 and 34 connected to the abutments 48 convey the current through the coil 5 through the springs 47 and spindle 62 in the usual way in such instruments. 64 is a coil form rigidly carried on the spindle 62 to rotate therewith and having wound on it the coil 5. 65 is a circular cover of insulating material screwed to the cover 41 to cover parts. The socket or receptacle 8 for the lamp 15 passes through a perforation in the cover 41 and is secured to an insulating block 67, carried on the rear face of said cover. The resistance coil 13 is also secured to said insulating block 67. The wires 32, 38 and 39 connected to said lamp socket are shown in Fig. 3, and also the wire 35 connecting the resistance 13 in circuit. The resistance 4ᵃ is also mounted on the under side of the cover 41 by being screwed thereto. In Fig. 3 the wire 30 by which it is connected to the movable coil 5 is shown. This wire 30 also extends from said coil 4ᵃ to contact 25 of switch 3.

Switch 3 is composed mechanically of the following parts shown in Figs. 3, 5, 6, 7 and 8. A knurled knob 70 is provided with two pointers 71 and a shaft 72 which passes through a perforation in the casing cover 41. Countersunk into the cover 41 is a ring 73 surrounding said knob and having three positions "watts", "volts" and "off" indicated thereon. On the end of the knob appear the word "Volts" and the number of volts of the circuit upon which the instrument is to be operated. Thus, as indicated in Fig. 7 the instrument is set for a circuit of 110 volts but is in the "off" position. By turning the knob 70 it may be connected by moving switch 3 to proper position to measure the voltage drop or watts consumed by a lamp in the 110 volt circuit. Mounted on the cover 41 is an insulating material disk 75 carrying contacts 23, 24, 25, 26, 27 and 28, each of which has a terminal 76 for its respective wire connection. The shaft 72 passes through the disk 75 and carries on its inner end a member 77 having an annular flange 78. 79 is a washer separating slightly disk 75 and member 77. The annular flange 78 has secured to it two copper springs 83 and 80 by screws 81 and each has two contact pins 82 situated in holes in the flange 78, said pins projecting from the inner face of said flange 78 and adapted to be forced by springs 83 and 80 into contact with the upper face of the insulating disk 75 and contacts 23 to 28. These contacts are provided with rounded depressions into which the rounded ends of the pins 82 are forced by the springs 79. These pins and springs may be said to constitute the two arms of the switch 3 of Figs. 1 and 2. The current brought to the various contacts 23 to 28 is conveyed between said contacts by the conducting pins 82 and springs 79 and 80 as will be readily understood. The end of member 77 is provided with a conducting plug 85 upon which the free end of a resilient arm 86 rests. This arm is carried by a post 87 fastened to the cover 41. This post also carries spring arms 88 and 89 which correspond to contacts 17 and 18 of Figs. 1 and 2. The wires 19 and 20 are shown as attached to them also in Fig. 3 and the wire 37 is shown reaching from the arm 86 to contact 24. 90 is a conducting plate connected with plug 85 by a pin 91 of conducting material.

Fig. 4 shows the resistances 1 and 4 as they are mounted within the main casing 42 of the instrument on pillars 92 projecting from a cross piece 93 fastened to the sides of the casing 42. The terminals 9 and 10 passing through the casing are here shown together with the wires 35 and 39 which connect them electrically in the instrument. The wires 16, 19 and 20 which connect the resistance 70 in circuit are also shown.

It will be evident from the above description of this switch that by properly rotating the knurled head 70, the connections made by it may be varied as described to vary the amount of resistance in circuit and to make the necessary connections for the voltmeter and wattmeter circuits. When the head 70 is turned to the off position as shown in Fig. 7, only two of the pins 82, one connected with each of the springs 80, will rest upon the terminals 24 and 25. The remaining two pins have their ends resting on the insulating disk 75, thereby breaking the circuit through the instrument.

The operation of my invention, referring more particularly to Figs. 1 and 2, when it is desired to ascertain the drop in voltage across or the number of watts consumed at the lamp is as follows: When the instrument is to be connected up with a circuit of say 110 volts, the switch arm 2 is placed upon the contact 18 and but one-half of the resistance 1—4 is in circuit—namely the part 1. The current enters the terminal 9 and passes through the wire 39 to resistance 1, to wire 20, contact 18, switch 2 and wire 37 to contact 28. If the full resistance is desired, as when the supply circuit is one of 220 volts the switch 2 is thrown to the contact 17, the path of the current being the same as before except that it now includes also the resistance 4 and its connecting wires 16 and 19. The movement of the switch 2 is accomplished by proper rotation of the knurled head 70 on the face of the instrument.

When the measurement of the drop in voltage across the lamp 15 is desired the switch 3 is placed in the position shown in Fig. 1. This is also accomplished by properly rotating the knurled head 70 so that the pointer thereon indicates "volts", when one of the arms of the switch 3 will connect contact 28 to contact 23 and the other arm contacts 26 and 27. The current path then follows the high resistance circuit composed of wire 37, contact 28, switch 3, contact 23, wire 34, field coil 11, movable coil 5 (into and from which it goes through springs 47 Figs. 3 and 5, in the usual manner) wire 32, compensating coil 6 to wire 38 to contact 27, switch 3 to contact 26, wire 35 through coil 13 and thence to terminal 10. At the same time a second circuit, in shunt with this one exists. It may be traced from terminal 9 by wire 39 to receptacle 8 and thence by wire 38 to contact 27, switch 3, contact 26, wire 35, resistance 13 and terminal 10. This circuit is of lower resistance than that of the circuit first above described. Under these conditions the movable coil 5 will be moved against the springs 47 in proportion to the number of volts drop in potential at the terminals of the lamp 15 and the extent thereof will be indicated by the movement of the pointer—over the scale.

Referring now to Fig. 2 in connection with the operation of my instrument when measuring the consumption of watts in the lamp 15, the switch 2 is indicated as in position to measure such quantity in a circuit of higher voltage such as 220 volts, and the switch 3 has the extremities of one of its arms brought to rest on the terminals 24 and 27, the other arm connecting terminals 28 and 25. These positions are secured by rotating the knurled head 70 of the switch as above described. The current path of the high resistance circuit then extends from terminal 9 through resistances 1 and 4, wire 19, switch 2, wire 37 to contact 28 through switch 3 to contact 25, by wire 30 through resistance 4ª to movable coil 5 (entering and emerging by springs 47 as before) by wire 32 through compensating coil 6 to wire 38 and back to terminal 27, switch 3 to terminal 24, by wire 36 to watt field coil 12 and finally by wire 35 to terminal 10. A second circuit of lower resistance exists simultaneously in the instrument from the terminal 9 by wire 39 through lamp 15 and receptacle 8 by wire 38 to terminal 27, switch 3, terminal 24, wire 36, field coil 12 and wire 35 back to terminal 10. When these circuits are in operation, the coil 5 will be moved against the springs 47 in proportion to the number of watts of energy consumed by the lamp 15 and the amount thereof will be indicated by the position of the pointer 45 on the scale.

In practice I have made the resistance 13 approximately equal to the resistance of the watt field coil 12 and the resistance 4ª about equal to the resistance of voltage field coil 11. I wind the fine copper wire compensating coil 6 simultaneously with coil 12 and in with the turns of the latter. I then connect it up in electrical opposition to the coils 11 and 12. In measuring voltage this coil 6 has practically no effect on the instrument for enough additional turns are wound on the coil 11 to neutralize it; but when measuring watts it compensates for the losses due to the instrument itself being in circuit. Were it not for coil 6, the meter when measuring the watts consumed by lamp 15 would read too high due to the watts taken by the instrument itself. In practice with the switch 3 at "watts" and the lamp removed, the pointer 45 should remain at zero.

Having fully described my invention, what I claim as new and desire to secure by Letters Patent of the United States is:

1. In an electrical measuring instrument, the combination with a receptacle for a translating device, field windings respectively in circuits of high and low resistance, and a movable winding, of a resistance, and means whereby the said receptacle may be connected between the circuit terminals in series circuit with the field winding in said low resistance circuit and the movable winding may be connected in shunt thereto, or whereby the said receptacle may be connected between the circuit terminals in series with the resistance, and the field winding in the high resistance circuit and the movable winding may be connected in series with each other and in shunt to the receptacle.

2. In an electrical measuring instrument, the combination with a receptacle for a translating device, stationary windings respectively in circuits of high and low resistance, and a movable winding, of a resistance approximately equal to that of the field winding which is in the low resistance circuit, and means whereby the said receptacle may be connected between the circuit terminals in series circuit with the field winding in the low resistance circuit and the movable winding may be connected in shunt thereto, or whereby the said receptacle may be connected between the circuit terminals in series with the resistance, and the field winding in the high resistance circuit and the movable winding may be connected in series with each other and in shunt to the receptacle.

3. In an electrical measuring instrument, the combination with a receptacle for a translating device, field windings respectively in circuits of high and low resistance, and a movable winding, of a resistance, and means whereby the circuit relations of the parts may be so adjusted as to cause the instrument to operate either as a voltmeter or as a wattmeter, and whereby the said receptacle may be connected in series circuit with the resistance in the former instance, and with the field winding in the low resistance circuit in the second instance.

4. In an electrical measuring instrument, the combination with a receptacle for a translating device, field windings respectively in circuits of high and low resistance, and a movable winding, of a resistance approximately equal to that of the field winding which is in the low resistance circuit, and means whereby the circuit relations of the parts may be so adjusted as to cause the instrument to operate either as a voltmeter, or as a wattmeter, and whereby the said receptacle may be connected in series circuit with the resistance in the former instance, and in series circuit with the field winding in the low resistance circuit in the second instance.

5. In an electrical measuring instrument, the combination with a receptacle for a translating device, field windings respectively in circuits of high and low resistance, and a movable winding, of a resistance, and means whereby the circuit relations of the parts may be so adjusted as to cause the instrument to operate either as a voltmeter or as a wattmeter, and whereby the resistance in series circuits with said receptacle, is maintained approximately the same under either condition.

6. In an electrical measuring instrument, the combination with a receptacle for a translating device, field windings respectively in circuits of high and low resistance, a compensating device for one of said windings, a movable winding, a resistance, and means whereby the circuit relations of the parts may be so adjusted as to cause the instrument to operate either as a volt meter or as a watt meter, and whereby the said receptacle may be connected in series circuit with the resistance in the former instance, and in series circuit with the field winding in the low resistance circuit in the second instance.

7. In an electrical measuring instrument, the combination with a receptacle for a translating device, field windings respectively in circuits of high and low resistance, a compensating coil wound in a direction opposite to one of the stationary windings, a movable winding, a resistance, and means whereby the circuit relations of the parts may be so adjusted as to cause the instrument to operate either as a voltmeter or as a wattmeter, and whereby the said receptacle may be connected in series circuit with the resistance in the former instance and in series circuit with the field winding in the low resistance circuit in the second instance.

8. In an electrical measuring instrument, the combination with a receptacle for a translating device, field windings respectively in circuits of high and low resistance, and a movable winding, of a resistance and means whereby the circuit relations of the parts may be so adjusted as to cause the instrument to operate either as a voltmeter or as a wattmeter, and whereby the said receptacle may be connected in series circuit with the resistance in the former instance, and in series circuit with the field winding in the low resistance circuit in the second instance, said movable coil coöperating with but one of said field coils in each instance.

9. In an electrical measuring instrument, the combination with a receptacle for a translating device, field windings in circuits of high and low resistance and a movable winding, of a resistance approximately equal to that of one of said stationary windings, and means whereby the circuit relations of the parts may be so adjusted as to cause the instrument to operate either as a voltmeter or as a wattmeter, and whereby the said receptacle may be connected in series circuit with the resistance in the former instance and in series with the field windings in the circuit of low resistance in the second instance.

10. In an electrical measuring instrument, the combination with a receptacle for a translating device, field windings in circuits of high and low resistance, and a movable winding, of a resistance approximately equal to that of the stationary winding which is in the circuit of low resistance, and a second resistance approximately equal to that of the stationary winding which is in the circuit of high resistance, and means whereby the circuit relations of the parts may be so adjusted as to cause the instrument to operate either as a voltmeter or as a wattmeter, and whereby the said receptacle may be connected in series circuit with a resistance in the former instance, and in series circuit with the field winding in the circuit of low resistance in the second instance.

11. In an electrical measuring instrument, the combination with a receptacle for a translating device, of field windings in circuits of high and low resistance, and a movable winding of a resistance approximately equal to that of the stationary winding which is in the circuit of low resistance, and a second resistance approximately equal to that of the stationary winding which is in the circuit of high resistance, and means whereby the circuit relations of the parts may be so adjusted as to cause the instrument to operate either as a volt meter or as a watt meter, and whereby said receptacle may be connected in series circuit with the resistance in the former and in series circuit with the field winding in the circuit of low resistance in the second instance, and whereby said second resistance may be substituted for the field winding in the circuit of high resistance in the second instance.

12. In an electrical measuring instrument, the combination with a receptacle for a translating device, field windings respectively in circuits of high and low resistance, and a movable winding, of a variable resistance, a second resistance, and means whereby the circuit relations of the parts may be so adjusted as to cause the instrument to operate either as a voltmeter or as a wattmeter and whereby the said receptacle may be connected in series circuit with said second resistance in the former instance, and in series circuit with the field winding in the low resistance circuit in the second instance, and means for varying said variable resistance, said means also varying the connections of said instrument for measuring watts and volts.

In testimony whereof I have hereunto set my hand and affixed my seal in the presence of the two subscribing witnesses.

JOSHUA F. BEGOLE. [L. S.]

Witnesses:
JAMES H. BRYSON,
ELIZABETH BAILEY.